(12) United States Patent
Otsuka (10) Patent No.: US 10,391,792 B2
(45) Date of Patent: Aug. 27, 2019

(54) MEDIUM SPEED DETECTION DEVICE AND PRINTING APPARATUS

(71) Applicant: SEIKO EPSON CORPORATION, Tokyo (JP)

(72) Inventor: Shuji Otsuka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 403 days.

(21) Appl. No.: 15/250,350

(22) Filed: Aug. 29, 2016

(65) Prior Publication Data

US 2017/0057258 A1 Mar. 2, 2017

(30) Foreign Application Priority Data

Sep. 1, 2015 (JP) ................................. 2015-171826

(51) Int. Cl.
*G01P 3/36* (2006.01)
*B41J 13/00* (2006.01)
(Continued)

(52) U.S. Cl.
CPC .............. *B41J 13/0009* (2013.01); *B41J 2/01* (2013.01); *B41J 11/0095* (2013.01); *G01P 3/36* (2013.01)

(58) Field of Classification Search
CPC ...... B41J 13/0009; B41J 11/0095; B41J 2/01; G01P 3/36
(Continued)

(56) References Cited

U.S. PATENT DOCUMENTS

| 4,912,519 A * | 3/1990 | Yoshida .................. G01P 3/806 356/28 |
| 2001/0046042 A1* | 11/2001 | Theile ..................... G01P 3/803 356/28 |

(Continued)

FOREIGN PATENT DOCUMENTS

| JP | 63-193066 | 8/1988 |
| JP | 2003-215143 | 7/2003 |

(Continued)

OTHER PUBLICATIONS

HP Design jet Z6100-series Printers: Optical Media Advance Sensor, (8 pages), Mar. 2007.
(Continued)

*Primary Examiner* — Mark Hellner
(74) *Attorney, Agent, or Firm* — Workman Nydegger (57) ABSTRACT

A medium speed detection device includes a radiation optical system that radiates non-coherent light to a sheet-shaped medium which is being transported, a linear light reception optical system that includes n light reception units (where n is an integer equal to or greater than 2) receiving diffused/reflected light of the non-coherent light from the medium through light reception surfaces and in which the n light reception surfaces are arranged on an imaginary straight line in a transport direction of the medium, and a speed detection unit that obtains a speed of the medium based on a delay time obtained from a temporal correlation between an output of preceding light reception units with preceding light reception surfaces disposed on an upstream side in the transport direction and an output of following light reception units with following light reception surfaces disposed on a downstream side among the n light reception units.

16 Claims, 6 Drawing Sheets

(51) Int. Cl.
  *B41J 2/01* (2006.01)
  *B41J 11/00* (2006.01)
(58) Field of Classification Search
  USPC .......................................................... 356/28
  See application file for complete search history.

(56) References Cited

U.S. PATENT DOCUMENTS

| | | | | |
|---|---|---|---|---|
| 2003/0133097 | A1* | 7/2003 | Yamaguchi | B65H 7/14 |
| | | | | 356/28 |
| 2007/0206180 | A1* | 9/2007 | Liess | G01P 3/366 |
| | | | | 356/28 |
| 2010/0140864 | A1* | 6/2010 | Tachibana | B65H 7/14 |
| | | | | 271/227 |

FOREIGN PATENT DOCUMENTS

| | | |
|---|---|---|
| JP | 2013-231658 | 11/2013 |
| JP | 2013 231658 A | 11/2013 |
| JP | 2015-064324 | 4/2015 |
| JP | 2017-044511 A | 3/2017 |

OTHER PUBLICATIONS

Atsushi Takaura, Ricoh Technical Report No. 39, Development of Laser Speckle-Based Displacement Sensor with High Accuracy, (30 pages), Jan. 2014.

Nakamura Yukito, The Development of High Response Speckle Velocimeter, (26 pages), Konica Technical Report, vol. 4, Jan. 1991.

Haruna Masamitsu, Osaka University, Optical Coherence Tomography, (OCT), (25 pages), Medical Photonics, No. 1.

European Search Report for Application No. 16186671.0 dated Mar. 2, 2017.

\* cited by examiner

MEDIUM SPEED DETECTION DEVICE AND PRINTING APPARATUS

BACKGROUND

1. Technical Field

Embodiments of the present invention relate to a medium speed detection device and to a printing apparatus that includes the medium speed detection device.

2. Related Art

In printing apparatuses, a scheme of analyzing image data obtained by imaging a sheet-shaped medium which is being transported and detecting a displacement amount (transport amount) of the medium (which is also referred to as a "real-image photography scheme"), as disclosed in JP-A-2013-231658, is known as a configuration for precisely transporting a sheet-shaped medium (a sheet or a film).

In the real-image photography scheme of JP-A-2013-231658, it is difficult to accelerate an imaging repetition speed. The difficulty in accelerating the imaging repetition speed becomes increasingly evident as the transport speed is further accelerated. In other words, the ability to increase the transport speed and precisely transport the sheet-shaped medium is limited by the imaging repetition speed.

Methods of widening a one-time imaged area and causing a captured image to have a high definition have been considered as solutions to this problem. Realizing these methods, however, is problematic because the sizes and costs of an imaging system device and an optical system device are increased to achieve these methods. Even when a given transport speed is accelerated in such a configuration where an imaged area is widened and an image is captured in a high definition, it is still necessary to increase the size and cost of a new apparatus in a case in which the transport speed is further accelerated. Therefore, The ability to increase the transport speed by widening the imaged area and capturing the image in high definition is limited. For this reason, it is preferable to further improve a configuration for detecting the speed of a medium which is being transported.

SUMMARY

Embodiments of the invention can be realized in the following aspects or application examples.

(1) According to an aspect of the invention, a medium speed detection device is provided. The medium speed detection device includes a radiation optical system that radiates non-coherent light to a sheet-shaped medium which is being transported. The medium speed detection device also includes a linear light reception optical system that includes n light reception units (where n is an integer equal to or greater than 2). The n linear light reception units receive diffused/reflected light of the non-coherent light from the medium through light reception surfaces. Thus, the n linear light reception units receive the light reflected by the medium. The n light reception surfaces are arranged on an imaginary straight line in a transport direction of the medium.

The medium speed detection device further includes a speed detection unit that obtains a speed of the medium based on a delay time obtained from a temporal correlation between an output of preceding light reception units with preceding light reception surfaces disposed on an upstream side in the transport direction and an output of following light reception units with following light reception surfaces disposed on a downstream side among the n light reception units.

According to the aspect of the invention, it is possible to resolve the problem of increasing the size and cost of the imaging system device and the optical system device described in the related art. Further, the speed of the sheet-shaped medium can be obtained with a simpler structure than in the related art.

(2) In the medium speed detection device according to the aspect of the invention, n may be equal to or greater than 3.

According to the aspect of the invention, it is possible to obtain the speed of the medium using the $_nC_2$ combinations of two light reception units which can be selected from the n light reception units.

(3) In the medium speed detection device according to the aspect of the invention, the n light reception surfaces may be arranged at positions at which intervals are mutually different on the straight line. Thus, intervals between adjacent light reception surfaces may be different.

According to the aspect of the invention, it is possible to improve the precision of the speed detection using two light reception surfaces in which the interval is comparatively large when the speed of the medium is high.

(4) In the medium speed detection device according to the aspect of the invention, the speed detection unit may obtain speeds of the medium using two or more combinations among $_nC_2$ combinations of two light reception units selected from the n light reception units and set the speeds of the medium determined from these combinations as speed candidates of the combinations. The speed detection unit may obtain a speed of the medium based on the speed candidates of the combinations.

According to the aspect of the invention, it is possible to obtain the most reliable speed of the medium using the plurality of speed candidates.

(5) In the medium speed detection device according to the aspect of the invention, the number of linear light reception optical systems may be m (where m is an integer equal to or greater than 2). The light reception surfaces of the n light reception units of each of the m linear light reception optical systems may be arranged on an imaginary straight line in the transport direction at different positions in a direction vertical to or transverse to the transport direction.

According to the aspect of the invention, it is possible to improve the precision of the speed detection since the speed of the medium can be obtained at or determined from the different positions in the direction vertical to or transverse to the transport direction.

(6) In the medium speed detection device according to the aspect of the invention, the speed detection unit may obtain speeds of the medium in or from each of the m linear light reception optical systems and set the speeds of the medium as speed candidates of the linear light reception optical systems, and may obtain the speed of the medium based on the speed candidates of the linear light reception optical system.

According to the aspect of the invention, it is possible to obtain the most reliable speed of the medium using the plurality of speed candidates.

(7) In the medium speed detection device according to the aspect of the invention, each of the n light reception units of the linear light reception optical system may include an optical fiber having one end surface as the light reception surface. Thus, one end surface of the optical fiber is arranged to receive the light reflected from the medium and is an example of a light reception surface.

According to the aspect of the invention, it is possible to easily configure the linear light reception optical system.

(8) In the medium speed detection device according to the aspect of the invention, the number of linear light reception optical systems may be m (where m is an integer equal to or greater than 2). The m linear light reception optical systems may have a fiber bundle including m×n optical fibers with one end surface serving as the light reception surface and receiving the diffused/reflected light from the medium. In one example, one end surface of each fiber in the fiber bundle may serve as a light reception surface.

According to the aspect of the invention, it is possible to easily configure the medium speed detection device including the m linear light reception optical systems.

(9) In the medium speed detection device according to the aspect of the invention, the speed detection unit may obtain speeds of the medium in or from two or more combinations among $_nC_2$ combinations of two light reception units selected from the n light reception units in each of the m linear light reception optical systems and set the speeds of the medium determined from these combinations as speed candidates of the combinations. The speed detection unit may obtain speed candidates of each of the linear light reception optical systems based on the speed candidates of the combinations and obtain the speed of the medium based on the speed candidates of each of the linear light reception optical systems.

According to the aspect of the invention, it is possible to obtain the most reliable speed of the medium using the speed candidates of the linear light reception optical systems.

(10) According to another aspect of the invention, a printing apparatus is provided. The printing apparatus includes the foregoing medium speed detection device and a printing unit that performs printing on the medium.

The invention can be realized in various forms. For example, the invention can be realized in various forms such as various electronic apparatuses, such as a printing apparatus, including a medium transport state detection method, a medium transport device, a medium transport control device, a medium transport control method, and a medium speed detection device as well as the medium speed detection device.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

A. First Embodiment

Figure 1:
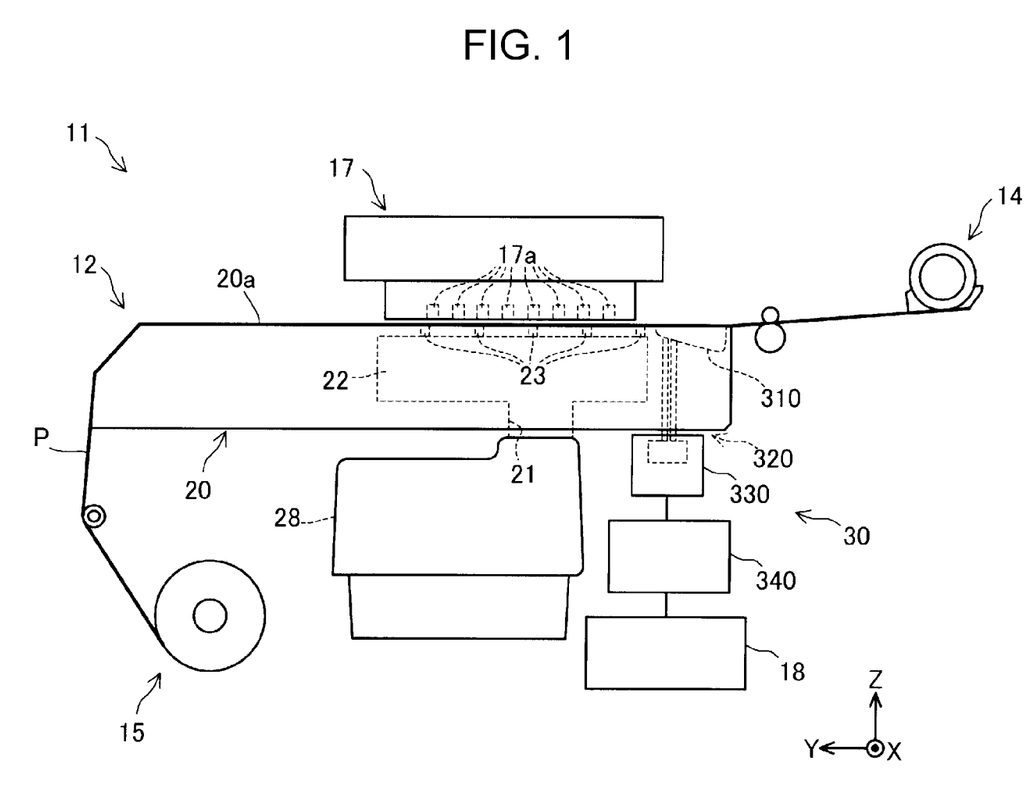
FIG. 1 is a schematic diagram illustrating a configuration of an ink jet printer that includes a medium speed detection device according to a first embodiment.

FIG. 1 is a schematic diagram illustrating a configuration of an ink jet printer that includes an example of a medium speed detection device 30 according to a first embodiment. An ink jet printer (hereinafter also simply referred to as a "printer") 11, which is an example of a printing apparatus, includes a transport device 12 that transport a long-sheet-shaped continuous sheet P, which is an example of a sheet-shaped medium. The printer 11 also includes a printing unit 17 that performs printing by ejecting ink to the continuous sheet P transported by the transport device 12. The printer 11 includes a control unit 18 that controls the transport device 12 and the printing unit 17.

The transport device 12 includes a sending unit 14 that continuously sends out the continuous sheet P and a winding unit 15 that winds the continuous sheet P continuously sent out from the sending unit 14 and subjected to printing by the printing unit 17. The printing unit 17 is disposed to face a transport path of the continuous sheet P at a position between the sending unit 14 and the winding unit 15. A plurality of nozzle rows 17a that eject ink to the continuous sheet P are formed on the surface of the printing unit 17 facing the transport path of the continuous sheet P. Each nozzle row 17a includes a plurality of nozzles arranged in a direction intersecting a transport direction.

In the transport device 12, a medium support unit 20 that supports the continuous sheet P at a position facing the printing unit 17 with the transport path of the continuous sheet P interposed therebetween is shown in FIG. 1. The medium support unit 20 has, for example, a bottomed quadrangular box shape. An opening 21 is formed on the lower surface side of the medium support unit 20 opposite the printing unit 17.

Below the lower surface of the medium support unit 20, a suction fan 28, which is an example of a suction unit sucking air in an inner space 22 of the medium support unit 20, is installed on the opening 21. Thus, the suction fan 28 covers or blocks the opening 21. A facing surface of the medium support unit 20 facing the printing unit 17 is formed as a horizontal support surface 20a that supports the continuous sheet P which is being transported. In the medium support unit 20, a plurality of suction holes 23 are formed to adsorb or suction the continuous sheet P to the support surface 20a. The suction holes 23 each communicate with the inner space 22 of the medium support unit 20. In such a configuration, by rotatably driving the suction fan 28 and sucking air using the opening 21 as an intake port, a negative pressure is achieved in the space between the continuous sheet P and the medium support unit 20 via the inner space 22 and the suction hole 23. Thus, a suction force for adsorbing or suctioning the continuous sheet P to the support surface 20a is applied to the continuous sheet P.

The medium speed detection device 30 is installed below the medium support unit 20. The medium speed detection device 30 detects a transport speed of the continuous sheet P and may be installed on the upstream side of the transport path from or relative to the plurality of suction holes 23 in one example. The medium speed detection device 30 includes a radiation optical system 310 that radiates non-coherent illumination light to the continuous sheet P, a light reception optical system 320 and a light reception circuit unit 330 that receive diffused/reflected light of the illumination light from the lower surface of the continuous sheet P, and a speed detection unit 340. As will be described below, the medium speed detection device 30 detects a speed of the continuous sheet P based on a change in the intensity of the diffused/reflected light of the non-coherent illumination light radiated to the lower surface of the continuous sheet P which is being transported. Thus, light reflected by the lower surface of the continuous sheet P can be used to determine a transport speed of the continuous (or non-continuous) medium.

Figure 2:
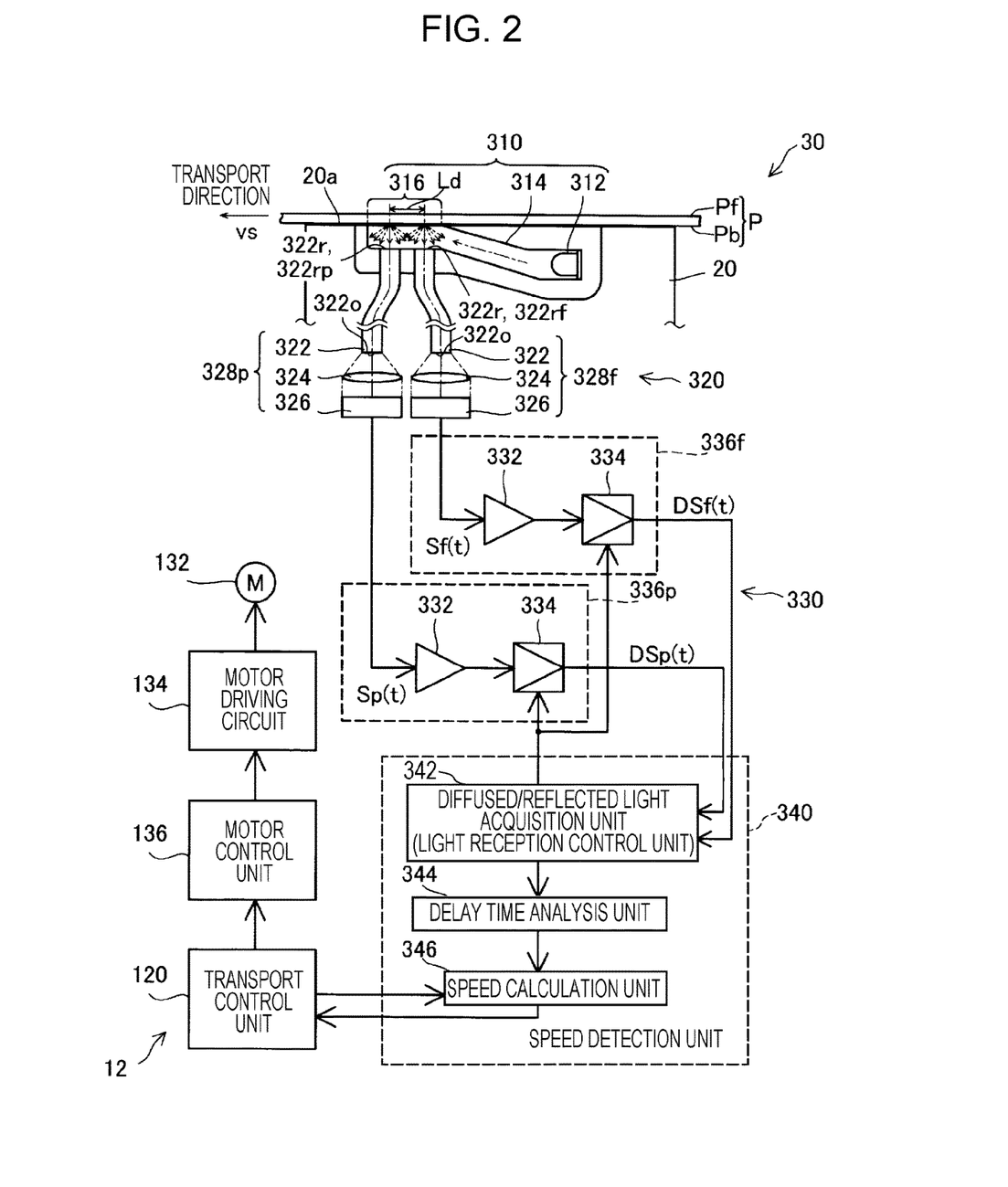
FIG. 2 is a schematic diagram illustrating the configuration of the medium speed detection device.

FIG. 2 is a schematic diagram illustrating the configuration of the medium speed detection device 30. As described above, the medium speed detection device 30 includes the radiation optical system 310, the light reception optical system 320, the light reception circuit unit 330, and the speed detection unit 340.

The radiation optical system 310 includes a light source 312 that emits non-coherent light and a light-guiding unit 314 that guides the non-coherent light emitted by the light source 312 as illumination light radiated to a lower surface Pb of the continuous sheet P passing through or over an opening 316 formed in the support surface 20a. As the light source 312, for example, a light-emitting diode (LED) that emits non-coherent light with the wavelength of or within an infrared region can be used. A light source such as an LED that emits non-coherent light with the wavelength of or within the visible region may be used. Here, non-coherent light with the wavelength of or within an infrared region is effective to detect a change in the surface of a medium according to the position of the medium as a change in the intensity of diffused/reflected light. In other words, changes in the intensity of the light diffused or reflected by the surface of the medium can be used to detect changes in the position of the medium. Further, the influence of ambient light can be suppressed. Hereinafter, the illumination light which is non-coherent light is simply abbreviated to illumination light in some cases.

The light reception optical system 320 includes two light reception units 328f and 328p that are arranged in the transport direction. Light reception surfaces 322rf and 322rp of or associated with the two light reception units 328f and 328p are disposed on an imaginary straight line in the transport direction of the continuous sheet P. The light reception optical system 320 is also referred to as a "linear light reception optical system". Each of the two light reception units 328f and 328p includes an optical fiber 322 (or other suitable optical conduit(s)), a condensing lens 324, and a photosensor 326. Of the two light reception units 328f and 328p, the light reception unit 328f disposed on the upstream side in the transport direction is referred to as a "preceding light reception unit 328f". The light reception unit 328p disposed on the downstream side is referred to as a "following light reception unit 328p".

The optical fibers 322 are disposed so that the light reception surfaces 322r of the optical fibers 322 come into contact with the light-guiding unit 314. The light reception surfaces 322r are disposed near the lower surface Pb of the continuous sheet P via the light-guiding unit 314. The optical fiber 322 receives the diffused/reflected light of the illumination light radiated to the continuous sheet P by the radiation optical system 310 through an incidence surface which is one end surface and serve as the light reception surface 322r. Thus, end surfaces of the optical fibers 322 are arranged have so as to receive the illumination light reflected by the medium.

The diffused/reflected light received by the light reception surfaces 322r exits the optical fibers 322 from an exit surface 322o which is the other end surface, for example, of the optical fibers 322. The light reception surface 322r of the optical fiber 322 of the preceding light reception unit 328f is the light reception surface 322rf of the preceding light reception unit 328f. The light reception surface 322r of the optical fiber 322 of the following light reception unit 328p is the light reception surface 322rp of the following light reception unit 328p. Hereinafter, the light reception surface 322rf of the preceding light reception unit 328f is referred to as a "preceding light reception surface 322rf" and the light reception surface 322rp of the following light reception unit 328p is referred to as a "following light reception surface 322rp".

The condensing lens 324 condenses the diffused/reflected light exiting from the exit surface 322o of the optical fiber 322 to be radiated to the photosensor 326. Thus, the diffused/reflected light condensed by the condensing lens 324 illuminates the photosensor 326. The photosensor 326 converts the intensity of the received diffused/reflected light into an electric signal (hereinafter also referred to as a "light reception signal"). As the photosensor 326, a photosensor (for example, a phototransistor or a photodiode) that has sensitivity in a wavelength region of the non-coherent light emitted by the light source 312 is used.

The radiation optical system 310 is fixed to the lower surface side of the support surface 20a. Energy of the diffused/reflected light incident on the light reception surface 322r of the optical fiber 322 decreases as the light reception surface 322r is further away from or moved away from the lower surface Pb of the continuous sheet P. In other words, the energy of the diffused/reflected light incident on the light reception surface 322r is related to the distance between the light reception surface 322r and the lower surface Pb. A visual field (the size of a region of the diffused/reflected light which can be incident on the surface of the medium) on the light reception surface 322r increases as the light reception surface 322r is further away from or is moved away from the lower surface Pb of the continuous sheet P. Accordingly, in order to stably receive the diffused/reflected light on the light reception surface 322r, a gap (interval) between the light reception surface 322r and the lower surface Pb of the continuous sheet P is preferably as narrow or short as possible without blocking the illumination light from the radiation optical system 310. In the example, the thickness of the light-guiding unit 314 corresponding to the gap between the light reception surface 322r and the lower surface Pb of the continuous sheet P is set in a range from 0.3 mm to 0.7 mm.

The size of the light reception surface 322r of the optical fiber 322 is preferably set to a size in which light can be received using a change in the texture of the surface of the sheet as a change in the diffused/reflected light. In other words, the changes in the texture of the surface of the sheet results in changes in the diffused/reflected light as the medium is transported and the size of the light reception surface 322r is set so that these changes can be detected. For example, a normal plain sheet is configured such that dietary fiber (mainly, cellulose) with a length of about 0.25 mm to 50 mm and a thickness of 4 µm to 70 µm are amorphously woven and is configured by unevenness of a periodic interval of about 1 µm to 500 µm. The unevenness can be detected as a change in the diffused/reflected light. For example, a square visual field in which one side is a few to thousands of μm is preferably set. Accordingly, in the example, an optical fiber with a core diameter of 50 μm among general core diameters of 62.5 μm, 50 μm, or 9 to 10 μm of optical fibers is assumed to be used as the optical fiber 322. The visual field of the optical fiber is circular. However, even when an optical fiber with a square in which one side has the same size of the diameter is considered, the function of the visual field is almost the same.

The preceding light reception surface 322rf of the preceding light reception unit 328f and the following light reception surface 322rp of the following light reception unit 328p are disposed on the imaginary straight line in the transport direction at an interval Ld. For example, the interval Ld is set to be in a range of 50 to 300 μm. Both of the constituent elements, the two light reception units 328f and 328p, may not necessarily be disposed on the imaginary straight line in the transport direction. At least the preceding light reception surface 322rf or the following light reception surface 322rp may be disposed on the imaginary straight line in the transport direction.

The light reception circuit unit 330 includes a preceding light reception circuit 336f corresponding to the preceding light reception unit 328f and a following light reception circuit 336p corresponding to the following light reception unit 328p. Each of the two light reception circuits 336f and 336p includes an amplifier 332 and an AD (analog digital) converter 334. The amplifier 332 amplifies a light reception signal of the diffused/reflected light from the photosensor 326 to match an input range of the AD converter 334. The AD converter 334 quantizes an analog intensity signal of the diffused/reflected light in order at a given sampling period based on a sampling signal supplied from the speed detection unit 340 to convert the analog intensity signal into a digital intensity signal of the diffused/reflected light. That is, the preceding light reception circuit 336f outputs preceding diffused/reflected light data DSf(t) obtained in order by quantizing an intensity signal Sf(t) output from the preceding light reception unit 328f at the sampling period. The following light reception circuit 336p outputs following diffused/reflected light data DSp(t) obtained in order by quantizing an intensity signal Sp(t) output from the following light reception unit 328p at the sampling period.

The speed detection unit 340 is a control device that is configured as a computer system including a CPU, a memory such as a ROM or a RAM, and an interface. The speed detection unit 340 functions as a diffused/reflected light acquisition unit 342, a delay time analysis unit 344, and a speed calculation unit 346 by reading a program stored in the memory and executing the program.

The diffused/reflected light acquisition unit 342 functions as a light reception control unit that supplies sampling signals to the AD converters 334 of the preceding light reception circuit 336f and the following light reception circuit 336p. Pieces of diffused/reflected light data DSf(t) and DSp(t) are output in order at the sample period from the AD converters 334. The diffused/reflected light acquisition unit 342 acquires the pieces of diffused/reflected light data DSf(t) and DSp(t) output from the AD converters 334 in order. The sampling period is preferably set to a value in which the number of pieces of diffused/reflected light data sufficient for detecting a change in the diffused/reflected light at the time of movement of the continuous sheet P between the preceding light reception surface 322rf and the following light reception surface 322rp with high precision can be acquired. For example, when a transport speed vs is in the range of 0.1 μm/μs to 1 μm/μs, the interval Ld is 100 μm, and the sampling number is in the range of 100 to 1000, a sampling period ts is preferably set to any value in the range of 0.1 μs to 1 μs. In this example, ts=1 μs is set.

Figure 3:
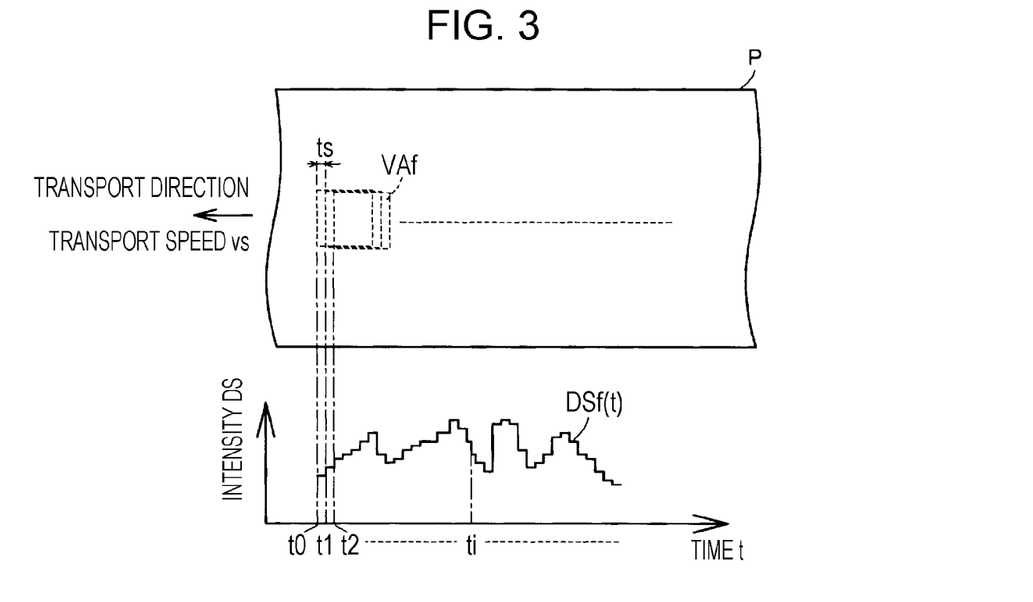
FIG. 3 is a diagram illustrating preceding diffused/reflected light data output from a preceding light reception circuit.

FIG. 3 is a diagram illustrating preceding diffused/reflected light data DSf(t) output from the preceding light reception circuit 336f. As described above, the circular visual field of the light reception surface 322r of the optical fiber 322 may be considered to be a square visual field with one side which has the same size as the diameter of the circular visual field. Therefore, to facilitate illustration, the shape of a visual field VAf of the preceding light reception unit 328f is drawn as a square.

As the continuous sheet P transported at the transport speed vs is moved, a visual field VA of the preceding light reception unit 328f is relatively deviated sequentially in an opposite direction to the transport direction of the continuous sheet P with reference to the continuous sheet P. At this time, the preceding light reception circuit 336f outputs sensor output values of the photosensor 326, that is, the diffused/reflected light data DSf(t) indicating the intensity of the diffused/reflected light from the continuous sheet P corresponding to the visual field VA at the position deviated in order at an interval (ts·vs) of the continuous sheet P, in order at each sampling period is in order is output from the AD converter 334. Although not illustrated, the following light reception circuit 336p outputs the diffused/reflected light data DSp(t) as in the preceding light reception circuit 336f. Here, since the following light reception unit 328p is disposed on the downstream side of the preceding light reception unit 328f in the transport direction at the interval Ld, a time delay occurs in the diffused/reflected light data DSp(t) output from the following light reception circuit 336p with respect to the diffused/reflected light data DSf(t) output from the preceding light reception circuit 336f according to the deviation. Hereinafter, the diffused/reflected light data DSf(t) is also referred to as "preceding diffused/reflected light data DSf(t)" and the diffused/reflected light data DSp(t) is also referred to as "following diffused/reflected light data DSp(t)".

The following diffused/reflected light data DSp(t) is assumed to be delayed by a delay time Δt expressed in Expression (1) below with respect to the preceding diffused/reflected light data DSf(t):

$$\Delta t = Ld/vs \quad (1).$$

Here, Ld indicates an interval between the preceding light reception surface 322rf and the following light reception surface 322rp and vs indicates a transport speed (movement speed) of the continuous sheet P.

When the delay time Δt can be known or determined in Expression (1) above, the transport speed vs can be calculated using the delay time Δt as a movement time. The delay time Δt is obtained as described below.

Figure 4:
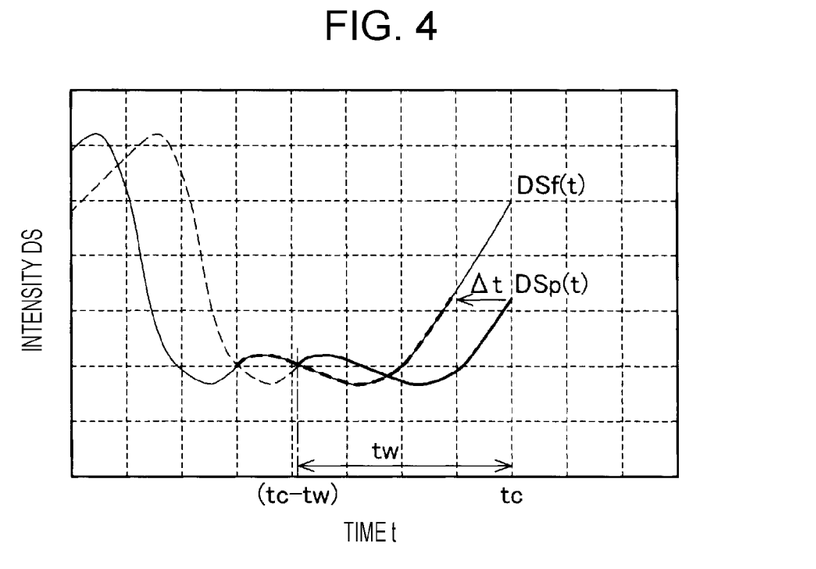
FIG. 4 is a graph illustrating a relation between preceding diffused/reflected light data and following diffused/reflected light data.

FIG. 4 is a graph illustrating a relation between the preceding diffused/reflected light data DSf(t) and the following diffused/reflected light data DSp(t). The delay time analysis unit 344 (see FIG. 2) takes a correlation between the preceding diffused/reflected light data DSf(t) and a diffused/reflected light data DSp(tc−tw) to DSp(tc) in a range previous by a period tw from a current time tc in the following diffused/reflected light data DSp(t). Then, a time difference Δt between the following diffused/reflected light data DSp(tc−tw) to DSp(tc) and preceding diffused/reflected light data DSf(tc−tw−Δt) to DSf(tc−Δt) (which is data in a range indicated by the thick dotted line in the drawing) correlated with the following diffused/reflected light data DSp(tc−tw) to DSp(tc) is obtained as the delay time. Specifically, the delay time Δt at which a correlation value R(Δt) expressed in Expression (2) below is minimum may be searched for.

$$R(\Delta t)=\int_{tc-tw}^{tc}\{DSf(t-\Delta t)-DSp(t)\}\cdot dt \qquad (2)$$

Here, tc indicates a current time and tw indicates a period in which the correlation is taken. In this example, tw=100 μs is set.

The speed calculation unit 346 (see FIG. 2) calculates the transport speed vs based on Expression (3) below which is obtained by modifying Expression (1) above.

$$vs=Ld/\Delta t=Ld/tm \qquad (3)$$

Here, Ld indicates an interval between the preceding light reception surface 322rf and the following light reception surface 322rp, tm indicates a movement time in which the continuous sheet P is moved by the interval Ld, and Δt is a delay time in which the correlation value R(Δt) obtained by the delay time analysis unit 344 is minimum.

In this way, the medium speed detection device 30 can obtain the transport speed (movement speed) vs of the continuous sheet P based on the delay time Δt which changes according to the position of the continuous sheet P being transported and is obtained from the temporal correlation between the preceding diffused/reflected light data DSf(t) and the following diffused/reflected light data DSp(t). The obtained transport speed vs is supplied to the transport control unit 120 (see FIG. 2) of the transport device 12.

A transport state of the continuous sheet P is controlled when the transport control unit 120 controls the motor control unit 136 based on the obtained transport speed vs and a target setting speed vr and the motor control unit 136 controls an operation of a sheet feeding motor 132 via a motor driving circuit 135 and drives the sheet feeding roller 13a (see FIG. 1). For example, in a case in which there is a difference between the transport speed vs and the target setting speed vr, the transport control unit 120 can control the operation of the sheet feeding motor 132 so that the transport speed vs becomes or is changed to the setting speed vr. By integrating the transport speed vs for a time at which the transport speed vs occurs, a movement amount of the continuous sheet P transported at the transport speed vs can be estimated. By integrating the difference between the transport speed vs and the setting speed vr for a time in which the difference occurs, a deviation of the movement amount with respect to the movement amount of the continuous sheet P in a case in which the continuous sheet P is transported at the setting speed vr can be estimated, and thus a position deviation of the continuous sheet P can also be estimated. Based on the deviations, the operation of the sheet feeding motor 132 can be controlled so that a deviation of a movement stop position of the continuous sheet P is corrected.

As described above, the radiation optical system 310 according to the first embodiment is configured as a radiation optical system that has a simple structure including the light source 312 that emits the non-coherent light and the light-guiding unit 314 that guides the non-coherent light emitted by the light source 312 as illumination light. The light reception optical system 320 is configured as a linear light reception optical system including two light reception units 328f and 328p that have a simple structure including the optical fiber 322, the condensing lens 324, and the photosensor 326. Accordingly, it is possible to resolve the problems of increasing the size and cost of the imaging system device and the optical system device described in the related art. That is, it is possible to detect the change in the texture state of the surface of the medium according to the position of the continuous sheet P as the change in the intensity of the diffused/reflected light at a high speed with a simple structure, and it is possible to obtain the transport speed of the continuous sheet P. In other words, changes in the intensity of the diffused/reflected light can be used to obtain the transport speed of the continuous sheet P and can be used to correct the transport speed of the continuous sheet P. The diffused/reflected light is detected at two different locations in the transport direction and the relationship between the data derived from the optical systems 320 can be used to obtain the transport speed of the continuous sheet P.

B. Second Embodiment

Figure 5:
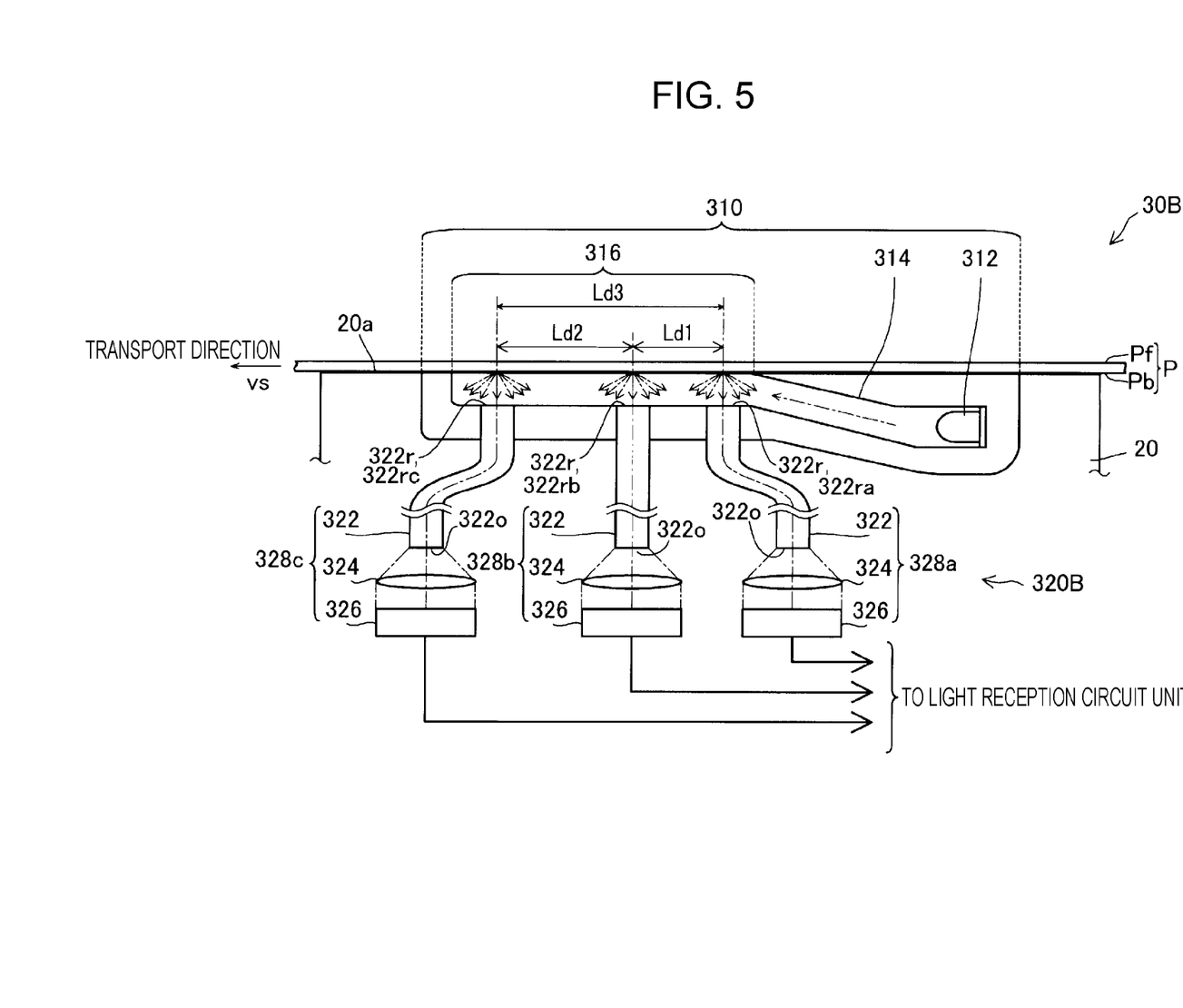
FIG. 5 is a schematic diagram illustrating a configuration of a part of a medium speed detection device according to a second embodiment.

FIG. 5 is a schematic diagram illustrating the configuration of a part of a medium speed detection device 30B according to a second embodiment. In the medium speed detection device 30B, the light reception optical system (also referred to as a "linear light reception optical system") 320 of the medium speed detection device 30 (see FIG. 2) according to the first embodiment is substituted with a light reception optical system (linear light reception optical system) 320B.

The linear light reception optical system 320B includes three light reception units 328a, 328b, and 328c arranged in order in the transport direction. Each of the three light reception units 328a, 328b, and 328c includes an optical fiber 322, a condensing lens 324, and a photosensor 326, as in the light reception unit 328f and 328p of the linear light reception optical system 320.

A first light reception surface 322ra of the first light reception unit 328a, a second light reception surface 322rb of the second light reception unit 328b, and a third light reception surface 322rc of the third light reception unit 328c are arranged on an imaginary straight line in the transport direction to be fixed to the surface of a light-guiding unit 314. The light reception surfaces 322ra, 322rb, and 322rc may be flush with the surface of the light-guiding unit 314. Ld1 is a first interval between the first light reception surface 322ra and the second light reception surface 322rb, Ld2 is a second interval between the second light reception surface 322rb and the third light reception surface 322rc, and Ld3 is a third interval between the first light reception surface 322ra and the third light reception surface 322rc. The second interval Ld2 is preferably set to an interval different from the first interval Ld1. In this example, Ld3>Ld2>Ld1 is set.

Although not illustrated in FIG. 5, the medium speed detection device 30B includes the light reception circuit unit 330 and the speed detection unit 340 (see FIG. 2), as in the medium speed detection device 30. The light reception circuit unit 330 outputs diffused/reflected light data obtained by quantizing the diffused/reflected light output from the three light reception units 328a, 328b, and 328c at the sampling period, in order at the sampling period.

In the speed detection unit 340, as in the first embodiment, the first light reception unit 328a serves as a preceding light reception unit and the second light reception unit 328b serves as a following light reception unit. Then, a delay time Δt1 of following diffused/reflected light data with respect to preceding diffused/reflected light data can be obtained as a movement time and a first transport speed vs1 (=Ld1/Δt1) can be obtained from Expression (3) above. The second light reception unit 328b serves as a preceding light reception unit and the third light reception unit 328c serves as a following light reception unit. Similarly, a second delay time Δt2 can be obtained as a movement time and a second transport speed vs2 (=Ld2/Δt2) can be obtained. Further, the first light reception unit 328a serves as a preceding light reception unit and the third light reception unit 328c serves as a following light reception unit. Similarly, a third delay time Δt3 can be obtained as a movement time and a third transport speed vs3 (=Ld3/Δt3) can be obtained. That is, three kinds of or three different transport speeds in three kinds of combinations of the preceding light reception units and the following light reception units in which the intervals are different can be obtained as speed candidates of the combinations. Then, the transport speed vs of the continuous sheet P can be obtained based on the obtained three kinds of speed candidates. In other words, the light reception units 328a, 328b, and 328c can be combined in different ways so as to generate transport speeds that are based on different combinations of light reception units and different intervals.

By selecting appropriate values in a pre-decided order according to the kinds of sheet, a speed, precision of the correlation, a history of previous measurement results, and the like, it is possible to determine which speed candidate is set to the transport speed vs of the continuous sheet P. For example, the transport speed can be determined as follows.

In general, when the transport speed is faster, a movement time of the continuous sheet P between the preceding light reception unit and the following light reception unit is faster. When the transport speed is slower, the movement time is delayed. Accordingly, when the interval between the preceding light reception unit and the following light reception unit is assumed to be constant, a difference between the preceding diffused/reflected light data and the following diffused/reflected light data decreases, and thus there is a possibility that the precision with which speed detection is performed may deteriorate. In this case, when the measurement is performed using a combination of the preceding light reception unit and the following light reception unit in which the interval is larger, the speed can be detected with higher precision.

When the interval between the preceding light reception unit and the following light reception unit is assumed to be constant, the delay time Δt in which the correlation value R(Δt) of Expression (2) above is minimum increases as the transport speed slows or becomes slower. Therefore, it takes longer to perform a process of deciding the delay time Δt. In this case, when a combination of the preceding light reception unit and the following light reception unit in which the interval is narrower or shorter is assumed to be used, the delay time Δt can be obtained in a shorter time and with high precision.

In the case of the medium speed detection device 30B according to the second embodiment, the measurement can be performed in combinations of three kinds of light reception units in which the intervals are different. In other words, the measurements can be performed using three different combinations of light reception units. Therefore, the most reliable speed candidate obtained by the combination of the light reception units in which the minimum value of the correlation value R(Δt) is the smallest and the highest correlation is obtained can be set as the transport speed vs of the continuous sheet P. Accordingly, it is possible to enlarge a range of the transport speeds in which the transport speed can be measured more reliably than the medium speed detection device 30 according to the first embodiment.

The linear light reception optical system 320B of the medium speed detection device 30B according to the second embodiment has been described in which the light reception surfaces 322ra, 322rb, and 322rc of the three light reception units 328a, 328b, and 328c are arranged at the positions at which the intervals are different. However, a linear light reception optical system in which the three light reception surfaces 322ra, 322rb, and 322rc are arranged at the same interval may be used. Even in this case, the interval between the first light reception surface 322ra and the third light reception surface 322rc is different from the interval between the first light reception surface 322ra and the second light reception surface 322rb and the interval between the second light reception surface 322rb and the third light reception surface 322rc. The invention is not limited to the linear light reception optical system including three light reception units. A linear light reception optical system including n light reception units (where n is an integer equal to or greater than 3) may be used. In this case, the speed detection unit may obtain the transport speeds of two or more combinations among $_nC_2$ combinations of two light reception units selected from n light reception units and set the transport speeds determined from those combinations as speed candidates of the combinations, and may obtain the transport speed based on the speed candidates of the combinations, as described above. For example, of the speed candidates of two or more combinations among $_nC_2$ combinations, the most reliable speed candidate obtained by the combination of the light reception units in which the minimum value of the correlation value R(Δt) is the smallest and the highest correlation is obtained can be set to the transport speed vs of the continuous sheet P. In addition, an average of the speed candidates may be obtained or determined and set as the transport speed vs. Values considerably different from the values of the other speed candidates among speed candidates of two or more combinations among $_nC_2$ combinations, for example, speed candidates with values different by ±10% or more, may be excluded, and an average of the remaining speed candidates may be obtained or determined and set as the transport speed vs. The maximum and minimum speed candidates may be excluded from the three speed candidates and the middle speed candidate may be set as the transport speed vs.

In the foregoing description, the case has been described in which the transport speeds in the combinations of the three kinds of light reception units are obtained as the speed candidates and the most reliable speed candidate of the speed candidates of the combinations is set as the transport speed. However, the invention is not limited thereto and the speed may be decided in accordance with another method. For example, a combination of the light reception units with the light reception surfaces for which an interval is appropriate may be selected based on a setting speed of the sheet feeding motor 132 set in the transport control unit 120 (see FIG. 2) and the transport speed may be obtained based on a correlation between the pieces of preceding diffused/reflected data and following diffused/reflected data obtained from the selected combination of the light reception units.

C. Third Embodiment

Figure 6:
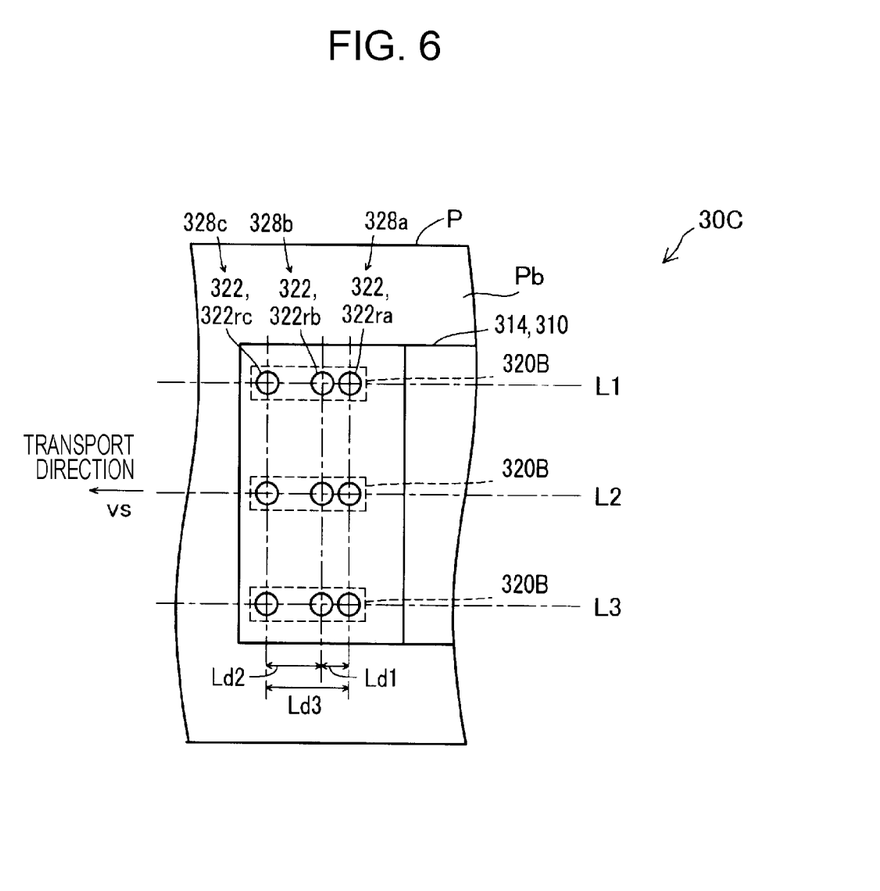
FIG. 6 is a schematic diagram illustrating a configuration of a part of a medium speed detection device according to a third embodiment.

FIG. 6 is a schematic diagram illustrating the configuration of a part of a medium speed detection device 30C according to a third embodiment. FIG. 6 is a plan view illustrating the medium speed detection device 30C when viewed from the side of the lower surface Pb of the continuous sheet P. The medium speed detection device 30C includes three linear light reception optical systems 320B (see FIG. 5) as light reception optical systems. In FIG. 6, only the light reception surfaces 322ra, 322rb, and 322rc of the light reception units 328a, 328b, and 328c of the three linear light reception optical systems 320B are illustrated, and the other constituent elements, the light reception circuit unit and the speed detection unit, of each linear light reception optical system are not illustrated in FIG. 6.

The light reception surfaces 322ra, 322rb, and 322rc of the light reception units 328a, 328b, and 328c of the linear light reception optical systems 320B are arrayed on imaginary straight lines L1, L2, and L3 in the transport direction at different positions in a direction vertical to or transverse to the transport direction on the surface of the light-guiding unit 314.

In the speed detection unit 340 (see FIG. 2), the linear light reception optical systems 320B can obtain the transport speed of the continuous sheet P on the corresponding imaginary straight lines L1, L2, and L3, as described in the second embodiment. Then, the obtained transport speeds can be set as the speed candidates of the linear light reception optical systems 320B and the transport speeds of the continuous sheet P can be obtained based on the speed candidates of the linear light reception optical systems 320B. For example, an average of the speed candidates may be obtained and set as the transport speed vs. Values considerably different from the values of the other speed candidates among three speed candidates, for example, the speed candidates with the values different by ±10% or more, may be excluded, and an average of the remaining speed candidates may be obtained and set as the transport speed vs. The maximum and minimum speed candidates may be excluded from the three speed candidates and the middle speed candidate may be set as the transport speed vs.

In the foregoing third embodiment, the light reception units 328a, 328b, and 328c of the linear light reception optical systems 320B are different in the positions in the direction vertical to or transverse to the transport directions, but are arranged at the same positions in the transport direction. However, the light reception units 328a, 328b, and 328c may be arranged at different positions even in the transport direction in accordance with the linear light reception optical systems 320B. Each of the linear light reception optical systems 320B may be associated with different intervals, for example. Further, the linear light reception optical systems may have different numbers of light reception units.

In the foregoing third embodiment, the linear light reception optical systems 320B including the three light reception units 328a, 328b, and 328c have been described as examples. As described in the second embodiment, linear light reception optical systems including n light reception units (where n is an integer equal to or greater than 3) may be used. The light reception surfaces of the n light reception units may be arranged at the same interval.

The number of linear light reception optical systems is not limited to 3, but the light reception optical systems may include m linear light optical systems (where m is an integer equal to or greater than 2). In this case, for example, an average value of m speed candidates may be obtained and set to the transport speed vs. The maximum and minimum speed candidates may be excluded from the m speed candidates and an average value of the middle speed candidates may be obtained and set as the transport speed vs. Values considerably different from the values of the other speed candidates among the m speed candidates, for example, the speed candidates with the values different by ±10% or more, may be excluded, and an average of the remaining speed candidates may be obtained and set to the transport speed vs.

In the foregoing third embodiment, the configuration in which the plurality of linear light reception optical systems 320B are included on the surface of the light-guiding unit 314 of one radiation optical system 310 has been described an example. However, a configuration in which a different radiation optical system is included for each linear light reception optical system may be used.

D. Fourth Embodiment

Figure 7:
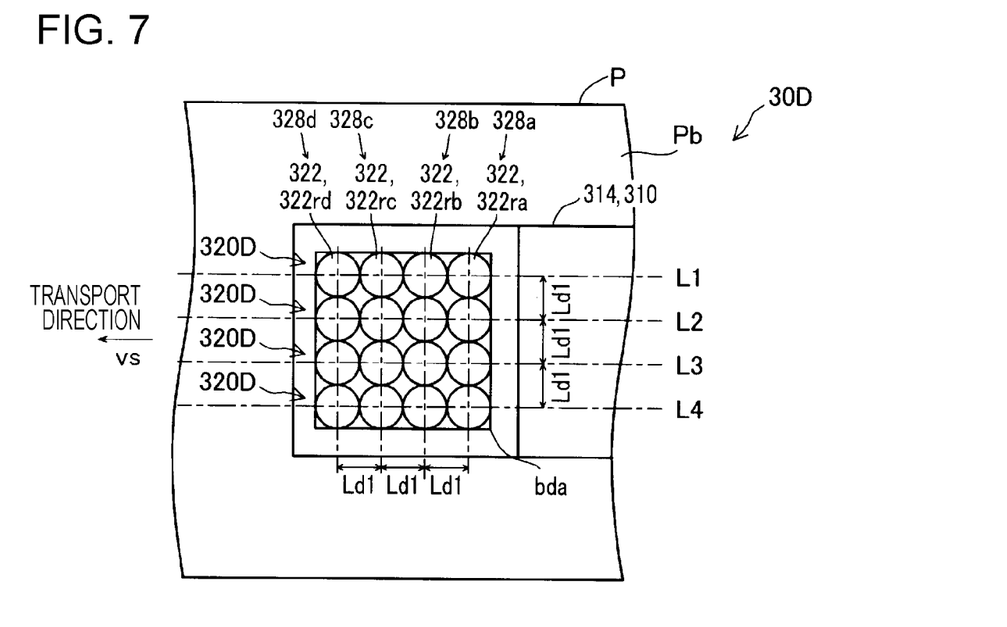
FIG. 7 is a schematic diagram illustrating a configuration of a part of a medium speed detection device according to a fourth embodiment.

FIG. 7 is a schematic diagram illustrating the configuration of a part of a medium speed detection device 30D according to a fourth embodiment. FIG. 7 is a plan view illustrating the medium speed detection device 30D when viewed from the side of the lower surface Pb of the continuous sheet P. The medium speed detection device 30D includes four linear light reception optical systems 320D as light reception optical systems. Each linear light reception optical system 320D includes four light reception units 328a, 328b, 328c, and 328d. Each of the four light reception units 328a, 328b, 328c, and 328d includes the optical fiber 322, the condensing lens 324, and the photosensor 326, as in the light reception units 328f and 328p of the light reception optical system 320 (see FIG. 2). In FIG. 7, only the light reception surfaces 322ra, 322rb, 322rc, and 322rd of the light reception units 328a, 328b, 328c, and 328d of each linear light reception optical system 320D are illustrated, and the other constituent elements, the light reception circuit unit and the speed detection unit, of each linear light reception optical system are not illustrated.

The light reception surfaces 322ra, 322rb, 322rc, and 322rd of the light reception units 328a, 328b, 328c, and 328d of the linear light reception optical systems 320D are arranged at the interval Ld1 on the imaginary straight lines L1, L2, L3, and L4 in the transport direction at different positions in the direction vertical to or transverse to the transport directions on the surface of the light-guiding unit 314. The intervals of the imaginary straight lines L1, L2, L3, and L4 in the direction vertical to the transport direction are also Ld1 in this example.

The light reception units 328a, 328b, 328c, and 328d of each linear light reception optical system 320D are configured using a fiber bundle bda. The fiber bundle bda is configured to include 4×4 optical fibers arranged in a square lattice form to come into contact with each other.

The speed detection unit 340 (see FIG. 2) can obtain the transport speed of the continuous sheet P in each of the corresponding imaginary straight lines L1, L2, L3, and L4 in accordance with each linear light reception optical system 320D, as described in the second embodiment. As described in the third embodiment, the obtained transport speeds can be set as speed candidates of each linear light reception optical system 320D and the transport speed of the continuous sheet P can be obtained based on the speed candidates of each linear light reception optical system 320D.

In the fourth embodiment, because the 4×4 optical fibers included in the fiber bundle bda are used as the four linear light reception optical systems 320D, the four linear light reception optical systems 320D can be arranged to have a compact structure with high precision.

Figure 8:
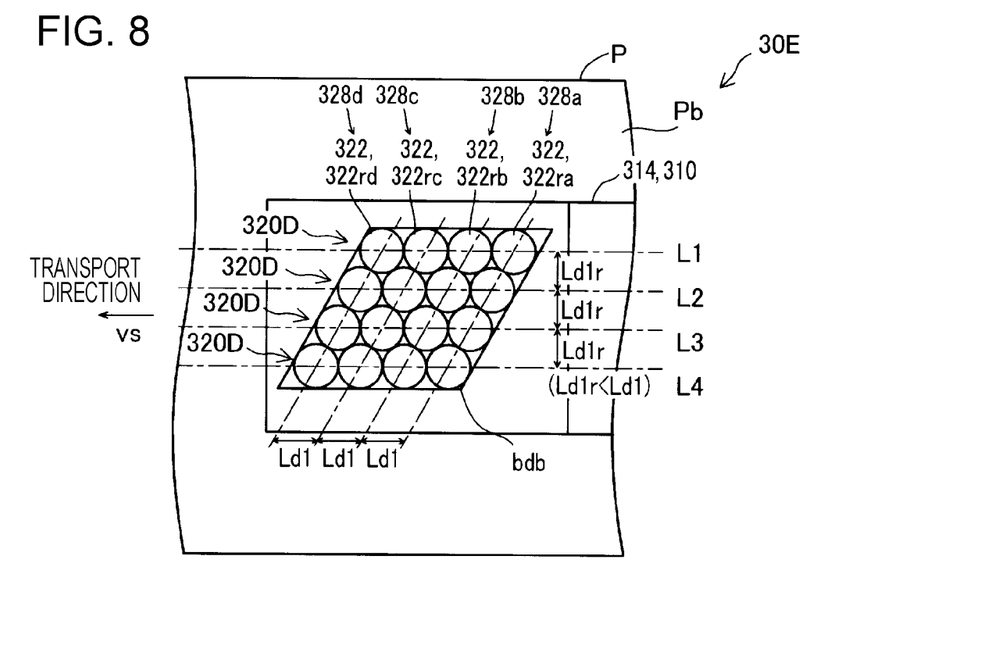
FIG. 8 is a schematic diagram illustrating a configuration of a medium speed detection device using a fiber bundle according to a modification example.

FIG. 8 is a schematic diagram illustrating the configuration of a medium speed detection device 30E using a fiber bundle bdb according to a modification example. The medium speed detection device 30E is the same as the medium speed detection device 30D illustrated in FIG. 7 except that the fiber bundle bdb is used in place of the fiber bundle bda (see FIG. 7).

The 4×4 optical fibers 322 of fiber bundle bdb are arranged to come into contact with each other, as in the fiber bundle bda in FIG. 7. Here, while the centers of the optical fibers of the fiber bundle bda in FIG. 7 are arranged in the square lattice form, the center of the optical fibers of the fiber bundle bdb in FIG. 8 are arranged in a regular triangular lattice form. FIG. 8 illustrates an example in which rows of the optical fibers 322 from the linear light reception optical system 320D of the optical fibers 322 lined on the imaginary straight line L1 on the uppermost side to the linear light reception optical system 320D of the optical fibers 322 lined on the imaginary straight line L4 on the lowermost side are arranged to be deviated in order by a radius of the optical fiber in the transport direction. Thus, adjacent rows are offset by a radius of the optical fiber in the transport direction in one example. Spacers could be used to change the offset and to create different intervals.

In a case in which the fiber bundle bdb is used, the interval Ld1$r$ of the optical fibers 322 of each light reception optical system lined to be vertical to the transport direction is narrower than the interval Ld1 of the optical fibers lined in the transport direction. Therefore, the four linear light reception optical systems 320D can be disposed with high precision with a compact structure more than in the case of the medium speed detection device 30D. However, in the case of the medium speed detection device 30D, the positions of the linear light reception optical systems 320D in the transport direction are the same. In the case of the medium speed detection device 30E, however, the positions of the linear light reception optical systems 320D in the transport direction are different according to the deviation of the optical fibers 322 in the transport direction.

The fiber bundles bda and bdb including the 4×4 optical fibers 322 are merely examples and the invention is not limited thereto. A fiber bundle including m×n optical fibers 322 can be used according to the number m of linear light reception optical systems (where m is an integer equal to or greater than 2) and the number n of linear light reception units (where n is an integer equal to or greater than 2) of the linear light reception optical systems included in the medium speed detection device.

E. Modification Examples

The invention is not limited to the foregoing examples or embodiments, and can be embodied in various aspects within the scope of the invention without departing from the gist of the invention. For example, the invention can be modified as follows.

(1) The radiation optical system according to the foregoing embodiment has described as an example of the radiation optical system including the light source 312 that emits the non-coherent light and the light-guiding unit 314 that guides the non-coherent light emitted by the light source 312 as the illumination light. However, the invention is not limited thereto. The radiation optical system is, for example, a radiation optical system that has a structure disposed so that non-coherent light is radiated as illumination light to a sheet-shaped medium and diffused/reflected light of reflected light reflected from the medium is received by a light reception optical system, as in a dark field illumination optical system.

(2) The light reception optical system used in the foregoing embodiments has described as an example of a linear light reception optical system that includes n light reception units (where n is an integer equal to or greater than 2) including the optical fiber 322, the condensing lens 324, and the photosensor 326. However, the invention is not limited thereto. The light reception unit may be a light reception optical system that has a structure with a visual field in which the diffused/reflected light changed according to the texture of a medium is received.

One light reception unit may be configured to include m×n optical fibers (where m and n are integers equal to or greater than 2), m×n condensing lens, and m×n photosensors.

(3) The printing apparatus is not limited to a printer that has only a printing function, but may be a multi-functional machine. Further, the printing apparatus is not limited to a serial printer, but may be a line printer or a page printer.

(4) The sheet-shaped medium is not limited to a continuous sheet, but may be a single sheet, a film made of resin, a composite film of resin and metal (laminated film), a woven fabric, a non-woven fabric, a ceramic sheet, or the like. However, a transparent medium, a black medium, and a metal medium are excluded.

(5) The medium speed detection device is not limited to being installed in the printing apparatus, but may be installed in a processing apparatus in which a process other than printing is performed. An apparatus transporting a medium other than a continuous sheet may be used. For example, the medium speed detection device may be adopted in a drying apparatus in which a medium is transported in a dryer to perform a drying process. The medium speed detection device may be adopted in a surface treatment apparatus that performs surface treatment such as coating or surface modification treatment on a medium. The medium speed detection device may be adopted in a processing apparatus that performs a punching process on a medium. Further, the medium speed detection device may be applied in a deposition apparatus that performs electroless deposition on a medium. The medium speed detection device may be adopted in a circuit forming apparatus that prints a circuit on a tape-shaped substrate. The medium speed detection device may be adopted in a measurement apparatus that acquires a measurement value of the thickness, surface roughness, or the like of a medium. Further, the medium speed detection device may be adopted in an inspect apparatus that inspects a medium.

The invention is not limited to the embodiments, the examples, and the modification examples described above, but can be realized in various configuration within the scope of the invention without departing from the gist of the invention. For example, technical characteristics of the embodiments, the examples, and the modification examples corresponding to the technical characteristics of the aspects described in the SUMMARY can be appropriately replaced or combined to resolve some or all of the above-described problems or to achieve some or all of the above-described advantages. If the technical characteristics are not described as essentials in the present specification, the technical characteristics can be appropriately deleted.

The entire disclosure of Japanese Patent Application No: 2015-171826, filed Sep. 1, 2015 is expressly incorporated by reference herein in its entirety.

What is claimed is:

1. A medium speed detection device comprising:
  a radiation optical system that radiates non-coherent light to a sheet-shaped medium which is being transported;
  a linear light reception optical system that includes n light reception units (where n is an integer equal to or greater than 2) receiving diffused/reflected light of the non-coherent light from the medium through light reception surfaces and in which the n light reception surfaces are arranged on an imaginary straight line in a transport direction of the medium; and a speed detection unit that obtains a speed of the medium based on a delay time obtained from a temporal correlation between an output of preceding light reception units with preceding light reception surfaces disposed on an upstream side in the transport direction and an output of following light reception units with following light reception surfaces disposed on a downstream side among the n light reception units, wherein the n light reception surfaces are arranged at positions at which intervals are mutually different on the straight line.

2. The medium speed detection device according to claim 1, wherein n is equal to or greater than 3.

3. The medium speed detection device according to claim 2, wherein the speed detection unit obtains speeds of the medium in two or more combinations among $_nC_2$ combinations of two light reception units selected from the n light reception units and sets the speeds of the medium as speed candidates of the combinations, and obtains a speed of the medium based on the speed candidates of the combinations.

4. The medium speed detection device according to claim 1, wherein the number of linear light reception optical systems is m (where m is an integer equal to or greater than 2), and wherein the light reception surfaces of the n light reception units of the m linear light reception optical systems are arranged on an imaginary straight line in the transport direction at different positions in a direction vertical to the transport direction.

5. The medium speed detection device according to claim 4, wherein the speed detection unit obtains speeds of the medium in the m linear light reception optical systems and sets the speeds of the medium as speed candidates of the linear light reception optical systems, and obtains the speed of the medium based on the speed candidates of the linear light reception optical system.

6. The medium speed detection device according to claim 1, wherein each of the n light reception units of the linear light reception optical system includes an optical fiber having one end surface as the light reception surface.

7. The medium speed detection device according to claim 1, wherein the number of linear light reception optical systems is m (where m is an integer equal to or greater than 2), and wherein the m linear light reception optical systems have a fiber bundle including m×n optical fibers with one end surface serving as the light reception surface and receiving the diffused/reflected light from the medium.

8. The medium speed detection device according to claim 7, wherein the speed detection unit obtains speeds of the medium in two or more combinations among $_nC_2$ combinations of two light reception units selected from the n light reception units in each of the m linear light reception optical systems and sets the speeds of the medium as speed candidates of the combinations, and obtains speed candidates of each of the linear light reception optical systems based on the speed candidates of the combinations and obtains the speed of the medium based on the speed candidates of each of the linear light reception optical systems.

9. A printing apparatus comprising:
the medium speed detection device according to claim 1; and
a printing unit that performs printing on a medium.

10. A printing apparatus comprising:
the medium speed detection device according to claim 2; and
a printing unit that performs printing on a medium.

11. A printing apparatus comprising:
the medium speed detection device according to claim 3; and
a printing unit that performs printing on a medium.

12. A printing apparatus comprising:
the medium speed detection device according to claim 4; and
a printing unit that performs printing on a medium.

13. A printing apparatus comprising:
the medium speed detection device according to claim 5; and
a printing unit that performs printing on a medium.

14. A printing apparatus comprising:
the medium speed detection device according to claim 6; and
a printing unit that performs printing on a medium.

15. A printing apparatus comprising:
the medium speed detection device according to claim 7; and
a printing unit that performs printing on a medium.

16. A printing apparatus comprising:
the medium speed detection device according to claim 8; and
a printing unit that performs printing on a medium.

* * * * *